United States Patent
Demuynck

(10) Patent No.: US 8,098,319 B2
(45) Date of Patent: Jan. 17, 2012

(54) PORTABLE ELECTRONIC DEVICE HAVING HIGH-RESOLUTION CAMERA WITH TUNABLE SENSOR AUTO FOCUS

(75) Inventor: Randolph Cary Demuynck, Wake Forest, NC (US)

(73) Assignee: Sony Ericsson Mobile Communications, Lund (SE)

( * ) Notice: Subject to any disclaimer, the term of this patent is extended or adjusted under 35 U.S.C. 154(b) by 1067 days.

(21) Appl. No.: 11/931,285

(22) Filed: Oct. 31, 2007

(65) Prior Publication Data

US 2009/0111512 A1 Apr. 30, 2009

(51) Int. Cl.
- H04N 5/225 (2006.01)
- H04N 9/07 (2006.01)
- G02B 13/16 (2006.01)
- H04M 1/00 (2006.01)

(52) U.S. Cl. ........ 348/335; 348/337; 348/373; 348/345; 455/556.1; 455/575.3

(58) Field of Classification Search .......... 348/377, 348/207.99, 373–376, 335, 337, 345; 455/556.1, 455/575.3
See application file for complete search history.

(56) References Cited

U.S. PATENT DOCUMENTS

| | | | |
|---|---|---|---|
| 5,969,760 A * | 10/1999 | Ernest et al. ............ | 348/357 |
| 6,339,508 B1 | 1/2002 | Nozawa et al. | |
| 6,992,699 B1 * | 1/2006 | Vance et al. ............ | 348/207.99 |
| 7,246,955 B2 * | 7/2007 | Cho et al. ............... | 396/349 |
| 2002/0065102 A1 * | 5/2002 | Miyake et al. .......... | 455/556 |
| 2002/0142810 A1 * | 10/2002 | Kawasaki et al. ...... | 455/566 |
| 2003/0123232 A1 * | 7/2003 | Huang et al. .......... | 361/751 |
| 2005/0026658 A1 * | 2/2005 | Soejima ................ | 455/575.1 |

(Continued)

FOREIGN PATENT DOCUMENTS

EP 1 389 015 2/2004

(Continued)

OTHER PUBLICATIONS

International Search Report and Written Opinion for corresponding application No. PCT/US2008/062606 dated Sep. 10, 2008.

*Primary Examiner* — Nhan T Tran
*Assistant Examiner* — Tuan Le
(74) *Attorney, Agent, or Firm* — Renner, Otto, Boiselle & Sklar, LLP

(57) ABSTRACT

To improve the consumer experience with portable electronic devices, a high-resolution digital camera function is incorporated into a multifunction portable electronic device. In exemplary embodiments, a clamshell portable electronic device, such as a mobile telephone, is provided with a digital camera/video function. The lens of the camera/video function is separated from an image sensor in a manner such that the two are not linearly aligned. Light coming through the lens is reflected by a reflective element, such as prism, onto the image sensor. The sensor is movable relative to a fixed position of the prism to provide an auto focus feature. In an exemplary embodiment, the sensor is movable along a portion of the width of the portable electronic device, the width being substantially greater in distance than the thickness of one of the clamshell portions. In this manner, the width of the portable electronic provides a greater distance available for the focal length than in the typical configuration, in which the lens and image sensor are linearly aligned within a clamshell portion. By increasing the focal length, higher resolution can be obtained.

16 Claims, 7 Drawing Sheets

U.S. PATENT DOCUMENTS

| | | |
|---|---|---|
| 2005/0140812 A1* | 6/2005 | Yoo et al. .................. 348/333.06 |
| 2006/0187324 A1* | 8/2006 | Lin ............................... 348/241 |
| 2006/0245080 A1 | 11/2006 | Takahashi et al. |
| 2006/0285006 A1* | 12/2006 | Shin et al. ...................... 348/345 |
| 2008/0019684 A1* | 1/2008 | Shyu et al. .................... 396/332 |

FOREIGN PATENT DOCUMENTS

| | | |
|---|---|---|
| WO | 02/11439 | 2/2002 |
| WO | 2005/099234 | 10/2005 |

* cited by examiner

PORTABLE ELECTRONIC DEVICE HAVING HIGH-RESOLUTION CAMERA WITH TUNABLE SENSOR AUTO FOCUS

TECHNICAL FIELD OF THE INVENTION

The technology of the present disclosure relates generally to portable electronic devices, and more particularly to a portable electronic device that includes a high-resolution digital camera function with a tunable sensor auto focus.

DESCRIPTION OF THE RELATED ART

Portable electronic devices commonly have a digital camera function as one of multiple functions. Due to the small size of such devices, however, it has been difficult to achieve the high resolution commonly attained in "stand-alone" digital cameras. Because of the typical low resolution, the camera function of a multifunction portable electronic device often is relegated to secondary usage when a stand-alone digital camera is not readily available. There currently appears to be a need for a better mechanism to incorporate a high-resolution digital camera function into a multifunction portable electronic device.

Portable electronic devices, such as mobile telephones, media players, personal digital assistants (PDAs), and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera for taking still photographs and/or video images, an Internet browser for accessing news and information, an audiovisual media player, a messaging device (text, audio, and/or visual messages), a gaming device, a personal organizer, and have other functions as well.

Despite this increase in functionality, the size of portable electronic devices is ever decreasing to enhance portability. Although the size decrease has not impeded many device functions, the small size presents particular challenges for providing a high-resolution digital camera function. Camera resolution in part is determined by the focal length—the distance between the lens and the surface of an image sensor that captures the image to be photographed. Other features being equal, the larger the focal length, the greater the typical potential resolution of the camera. Therefore, as the overall thickness of a portable electronic device becomes smaller, so does the maximum camera focal length, which tends to decrease the potential resolution of the camera.

A common configuration of portable electronic devices, and mobile telephones in particular, is the "clamshell" configuration. As is known in the art, in a typical clamshell telephone, the device is divided substantially into two halves, an upper portion and a lower portion, connected with a hinge-like structure. When the clamshell is open, the inner surfaces of both portions are accessible to the user. The upper portion commonly contains a display, and the lower portion commonly contains a numeric keypad and other functional input devices or buttons, although various clamshell device configurations may be employed. The upper portion may be pivoted about the hinge-like structure to close over the lower portion.

The clamshell configuration has certain advantages over a block or brick configuration. In the open position, the surface area of the face of the device is essentially doubled. This permits larger displays and increased functionality by allowing larger and more detailed keypads and input options.

It often is more difficult, however, to incorporate a high-resolution digital camera into the clamshell configuration. In the typical configuration, as is common in mobile telephones, the camera function is accessed when the clamshell is in the open position. In addition, the optical elements of the camera (the lens and image sensor) usually are located in one portion of the clamshell, which has only about a half to two-thirds the thickness of the device when in the closed position. Current clamshells may be as thin as about 10-14 mm when closed, which means only approximately 5-10 mm may be available in one clamshell portion to provide the focal length for the camera. With such thin dimensions, achieving a high-resolution camera function is difficult. In addition, many digital camera functions have an auto focus feature. In the conventional auto focus feature, the camera is focused by moving the lens relative to a fixed position of the image sensor. The mechanical elements associated with moving the lens further reduce the distance available for the focal length. Using current lens and imaging technology, the maximum resolution achievable is approximately 3.2 megapixels, and the actual resolution often is substantially lower.

SUMMARY

To improve the consumer experience with portable electronic devices, there is a need in the art for an improved system for incorporating a high-resolution digital camera function into a multifunction portable electronic device. In exemplary embodiments, a clamshell portable electronic device, such as a mobile telephone, is provided with a digital camera function. The lens of the camera function is separated from the image sensor in a manner such that the two are not linearly aligned. Light coming through the lens is reflected by a reflective element, such as a prism, onto the image sensor. The sensor is movable relative to a fixed position of the prism to provide an auto focus feature. In an exemplary embodiment, the sensor is movable along a portion of the width of the portable electronic device, the width being substantially greater in distance than the thickness of one of the clamshell portions. In this manner, the width of the portable electronic provides a greater distance available for the focal length than in the typical configuration, in which the lens and image sensor are linearly aligned within a clamshell portion. By increasing the focal length, higher resolution can be obtained.

Therefore, according to one aspect of the invention, a camera assembly for use in a portable electronic device comprises a lens, a reflective element, and an image sensor that is not linearly aligned with the lens, wherein light that passes through the lens is reflected by the reflective element and transmitted onto the image sensor. A sensor housing contains the image sensor, wherein the image sensor is movable within the sensor housing to alter the distance of the image sensor from the reflective element.

According to one embodiment of the camera assembly, the camera assembly further comprises a lens housing containing the lens and the reflective element.

According to one embodiment of the camera assembly, the reflective element has a first side and a second side and the lens is a first lens through which light passes to the first side of the reflective element, and the camera assembly further comprises a second lens through which light passes to the second side of the reflective element, and the light that passes through the second lens is reflected by the second side of the reflective element and transmitted onto the image sensor.

According to one embodiment of the camera assembly, the camera assembly further comprises a sleeve that is movable between a first position and a second position, wherein in the first position light is transmitted from the first lens to the reflective element and light is not transmitted from the second lens to the reflective element, and wherein in the second position, light is transmitted from the second lens to the reflective element and light is not transmitted from the first lens to the reflective element.

According to one embodiment of the camera assembly, the sleeve has a substantially cylindrical shape and is rotated between the first position and the second position.

According to one embodiment of the camera assembly, the reflective element is a prism.

According to another aspect of the invention, an electronic device comprises a camera assembly comprising a lens, a reflective element, and an image sensor that is not linearly aligned with the lens, wherein light that passes through the lens is reflected by the reflective element and transmitted onto the image sensor. A sensor housing contains the image sensor, wherein the image sensor is movable within the sensor housing to alter the distance of the image sensor from the reflective element. A camera housing contains the camera assembly.

According to one embodiment of the electronic device, the electronic device further comprises an upper clamshell potion and a lower clamshell portion, wherein the upper clamshell portion and lower clamshell portion are movable relative to one another between an open and a closed clamshell position, and further wherein the camera housing containing the camera assembly is the lower clamshell portion.

According to one embodiment of the electronic device, the camera assembly is oriented along a width of the lower clamshell portion, and the image sensor is movable along a portion of the width.

According to one embodiment of the electronic device, the camera assembly is oriented along a length of the lower clamshell portion, and the image sensor is movable along a portion of the length.

According to one embodiment of the electronic device, the sensor is movable within the lower clamshell portion for a distance of at least 20 mm.

According to one embodiment of the electronic device, the reflective element has a first side and a second side and the lens is a first lens through which light passes to the first side of the reflective element, and the electronic device further comprises a second lens through which light passes to the second side of the reflective element, and the light that passes through the second lens is reflected by the second side of the reflective element and transmitted onto the image sensor.

According to one embodiment of the electronic device, when the upper clamshell portion and lower clamshell portion are in the open clamshell position, the first lens is located on an inward face of the lower clamshell portion and the second lens is located on an outward face of the lower clamshell portion.

According to one embodiment of the electronic device, the first lens and the second lens are linearly aligned.

According to one embodiment of the electronic device, the first lens is a camera or video lens for taking photographs or videos, and the second lens is a video telephony lens for participating in video telephone calls.

According to one embodiment of the electronic device, the camera assembly further comprises a sleeve that is movable between a first position and a second position, wherein in the first position light is transmitted from the first lens to the reflective element and light is not transmitted from the second lens to the reflective element, and wherein in the second position, light is transmitted from the second lens to the reflective element and light is not transmitted from the first lens to the reflective element.

According to one embodiment of the electronic device, the sleeve has a substantially cylindrical shape and is rotated between the first position and the second position.

According to one embodiment of the electronic device, the resolution of the camera assembly is at least five megapixels.

According to one embodiment of the electronic device, the electronic device is a mobile telephone.

According to one embodiment of the electronic device, the reflective element is a prism.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
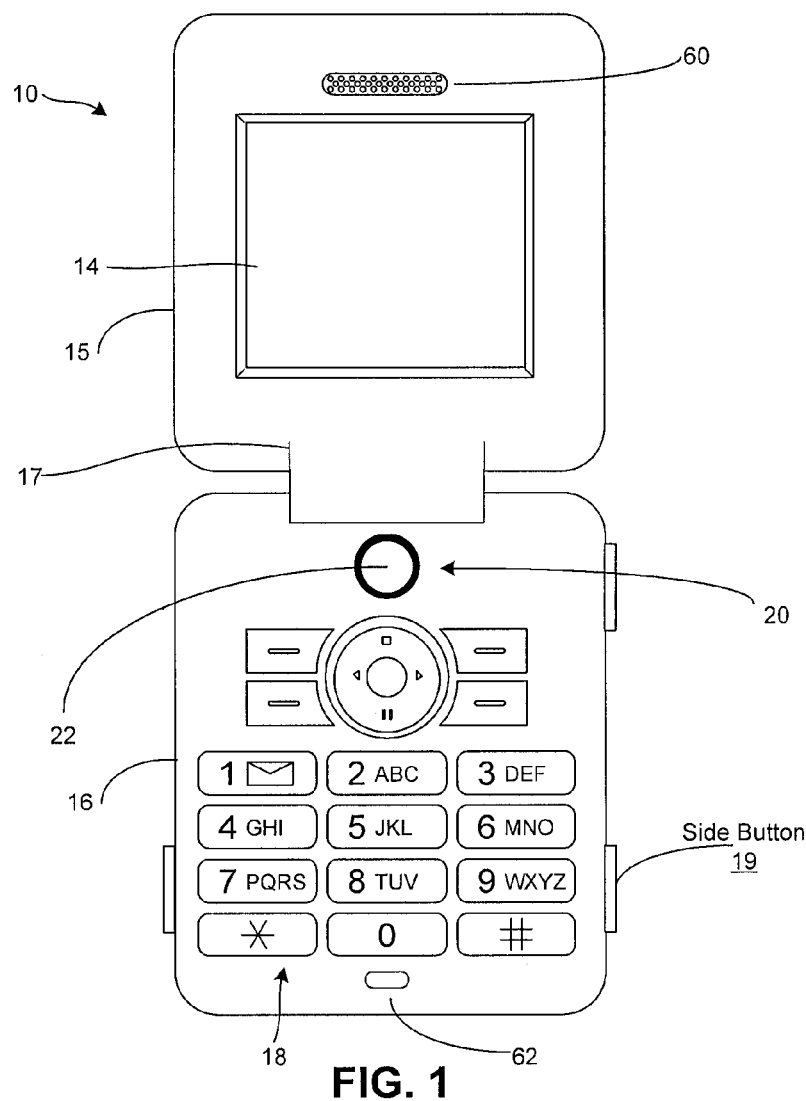
FIG. 1 is a schematic diagram of a mobile telephone as an exemplary electronic device for use in accordance with an embodiment of the present invention.

The present invention provides the user with a multifunction portable electronic device having a high-resolution digital camera function in a clamshell configuration. A high-resolution camera is provided by separating the lens and image sensor of the camera in a manner such that the lens and image sensor are not linearly aligned. The focal length is increased by using a reflective element, such as a prism, to reflect light that comes through the lens onto the image sensor.

In an exemplary embodiment, the sensor may be positioned in a sensor housing that fits within a hinge assembly of the clamshell electronic device. The sensor housing may be oriented along a portion of the width of the electronic device, and the sensor is movable within the housing along the width portion. Because the width typically has a substantially greater distance than the thickness of a clamshell portion, there is a greater distance for providing the available focal length in the present invention as compared to the conventional configuration. In one embodiment, the portable electronic device is a clamshell mobile telephone having an upper clamshell portion and a lower clamshell portion, with the camera features being located in the lower clamshell portion.

In an alternative embodiment, the lower clamshell portion incorporates one lens on each of its outward and inward faces. One of the lenses is an outward lens that is visible when the clamshell is in the closed position. The outward lens may provide a camera lens for ordinary camera function for taking still pictures or videos. The second lens is an inward lens that may be located adjacent the keypad and thus is visible on the inside face of the lower clamshell portion when the clamshell is in the open position. The inward lens may act a lens for video telephony. The two lenses may be linearly aligned with the reflective element therebetween. Light from either lens may be reflected onto the image sensor from the reflective element. A rotating, opaque sleeve may cover one or the other of the camera or video telephony lenses so that only one lens at a time is available for passing light to the reflective element. In this manner, one image sensor may provide the imaging for two lenses having different functions.

Embodiments of the present invention will now be described with reference to the drawings, wherein like reference numerals are used to refer to like elements throughout. It will be understood that the figures are not necessarily to scale.

The following description is made in the context of a conventional mobile telephone. It will be appreciated that the invention is not intended to be limited to the context of a mobile telephone and may relate to any type of appropriate electronic device, examples of which include a media player, a gaming device, or similar. For purposes of the description herein, the interchangeable terms "electronic equipment" and "electronic device" also may include portable radio communication equipment. The term "portable radio communication equipment," which sometimes hereinafter is referred to as a "mobile radio terminal," includes all equipment such as mobile telephones, pagers, communicators, electronic organizers, personal digital assistants (PDAs), smartphones, and any communication apparatus or the like.

FIG. 1 depicts an exemplary mobile telephone 10. Mobile telephone 10 may be a clamshell phone with a flip-open cover movable between an open and a closed position. The clamshell may include an upper clamshell portion 15 and a lower clamshell portion 16. The upper portion 15 may include a hinge portion 17 substantially contiguous therewith, which is in cooperation with the lower portion 16. In FIG. 1, the clamshell telephone is shown in the open position. In operation, the upper portion 15 may be pivoted about the hinge portion 17 to a closed position in which the upper portion 15 substantially covers the lower portion 16. It will be appreciated that mobile telephone 10 may have other configurations, such as a block or brick configuration, or a configuration with a sliding or swivel cover.

Mobile telephone 10 has a first display 14 viewable when the clamshell telephone is in the open position. The display 14 displays information to a user regarding the various features and operating state of the mobile telephone 10, and displays visual content received by the mobile telephone 10 and/or retrieved from a memory. A keypad 18 provides for a variety of user input operations. For example, keypad 18 typically includes alphanumeric keys for allowing entry of alphanumeric information such as telephone numbers, phone lists, contact information, notes, etc. In addition, keypad 18 typically includes special function keys such as a "send" key for initiating or answering a call, and others. Some or all of the keys may be used in conjunction with the display as soft keys. Keys or key-like functionality also may be embodied as a touch screen associated with the display 14. As further described below, keypad 18 may include various side buttons that may provide additional navigation and input operations. One of the side buttons may act as a shutter and/or record button 19 when a camera or video function is employed.

Mobile telephone 10 also includes a camera assembly 20. Camera assembly 20 may include an inward lens 22 which faces the user when the clamshell is in the open position. In the embodiment depicted in the figure, the inward lens is located adjacent the keypad in the lower clamshell portion 16. By facing the user when the clamshell is open, inward lens 22 may act as a video telephony lens which captures a video image of the user as the user participates in a telephone call. As is known in the art of video telephony, the image may be seen by a user on the other end of the telephone call, provided the other user also has a telephone with video telephony capabilities. If both telephones on a call have video telephony capabilities, then display 14 also may be used to display a video image of the user at the other end of the telephone call.

Figure 2:
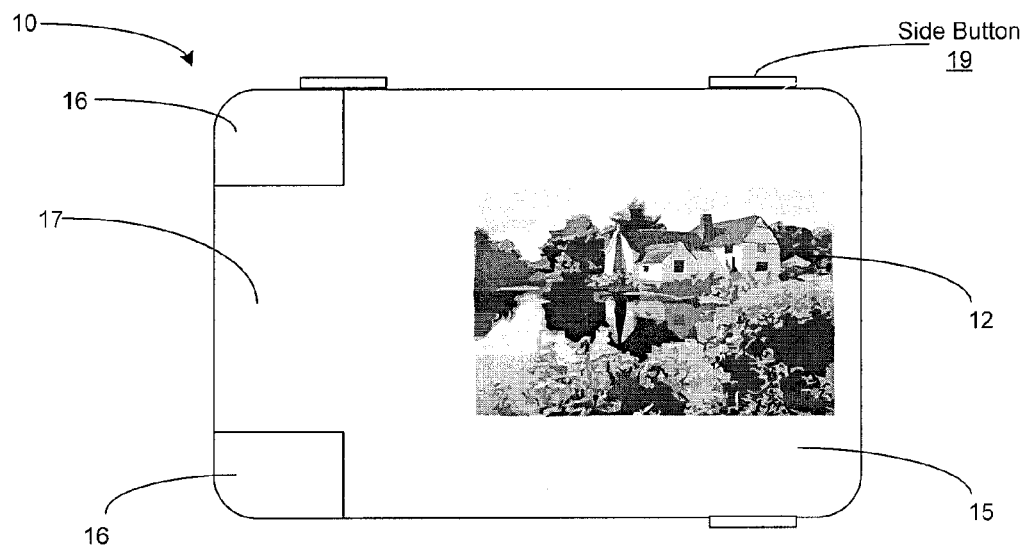
FIG. 2 is a schematic diagram of the mobile telephone of FIG. 1 from the viewpoint of a user of the camera function of the mobile telephone.

FIG. 2 is a schematic diagram of the mobile telephone 10 in the closed position. As seen by comparing FIG. 2 to FIG. 1, FIG. 2 depicts the closed mobile telephone rotated ninety degrees counter-clockwise from FIG. 1, with upper clamshell portion 15 facing outward from the page. The hinge portion 17 is on left side of upper portion 15, and sections of the lower clamshell portion 16 may be visible adjacent the hinge portion. Upper portion 15 may include a second display 12 that is viewable when the clamshell is in the closed position. In a non-camera mode, the second display 12 may display information about the state of the mobile telephone 10, such as, for example, signal strength, time, date, remaining battery power, etc.

FIG. 2 depicts the mobile telephone in a camera mode, which may be entered by the user in any conventional manner, such as by pressing one of the side buttons. In a camera mode, second display 12 may be used as a viewfinder for the camera function. In the depiction of FIG. 2, second display 12 is acting as the camera viewfinder and displays the subject matter of a potential photograph. One of the side buttons may act as the camera shutter button 19, which may be pressed to take a digital photograph. In another embodiment, the camera assembly of the mobile telephone also may have a digital video mode as well. In the digital video mode, the second display 12 may act as the viewfinder for the video camera. Side button 19 may act as a record button to initiate and pause the video operation. FIG. 2 depicts how a user would see the mobile telephone 10 when using the camera or video function. As is apparent, the manner by which the user holds the mobile telephone when using the camera function is comparable to how a user would hold a stand-alone digital camera. This configuration, therefore, tends to be more comfortable during use than configurations typical of current mobile telephones.

Figure 3:
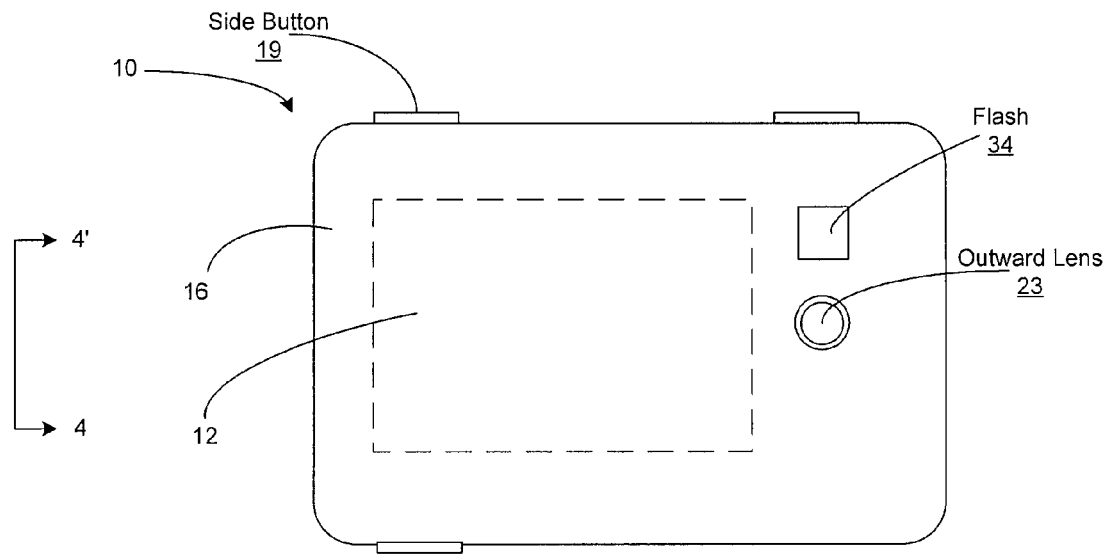
FIG. 3 is a schematic diagram of the mobile telephone of FIG. 1 from the viewpoint of a subject to be photographed using the camera function of the mobile telephone.

FIG. 3 depicts the view of mobile telephone 10 from the standpoint of a subject of a potential photograph (or video). In other words, FIG. 3 is a view from the opposite side of the mobile telephone as that depicted in FIG. 2, as may be seen by one to be photographed. As shown in FIG. 3, the subject of a potential photograph would be facing the lower clamshell portion 16 and would see an outward lens 23. Note that the outward lens 23 is separate and distinct from the inward lens 22. As further described below, the outward lens 23 may be used as a digital camera lens for taking digital still photographs. Outward lens 23 may also be used for taking moving digital video images. A built-in flash 34 also may be included in mobile telephone 10. In an exemplary embodiment, the flash is a Zeon flash. The position of the second display 12 is depicted in FIG. 3. The dashed lines indicate that the second display would not be visible to the subject being photographed. Rather, the second display would be on the upper clamshell portion 15 on the opposite side of the mobile telephone, i.e., on the user's side.

Figure 4:
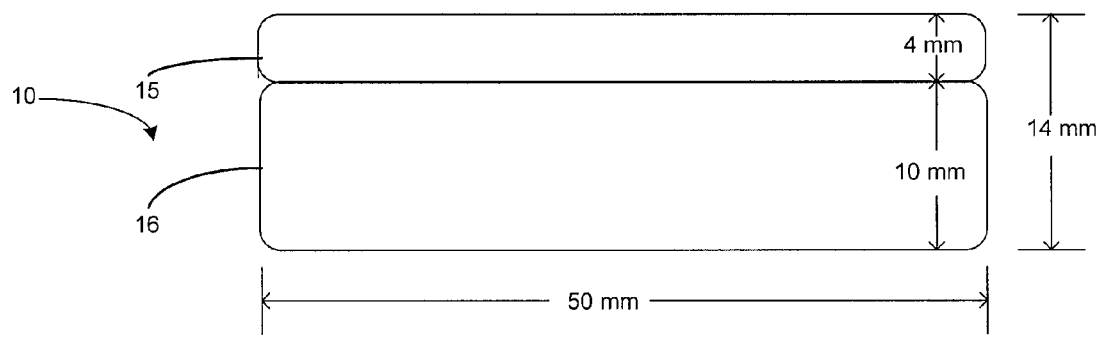
FIG. 4 is a schematic diagram of the mobile telephone of FIG. 1 as viewed along the line 4-4' shown in FIG. 3.

FIG. 4 is a schematic diagram of the mobile telephone 10 in the closed position along the viewing line 4-4' shown in FIG. 3. FIG. 4 is essentially a view from the bottom of the telephone when in the closed position and is provided to depict exemplary dimensions of a typical mobile telephone. It will be appreciated that FIG. 4 represents a typical configuration, but the precise dimensions may vary. Again, mobile telephone 10 may include upper clamshell portion 15 and lower clamshell portion 16. Although the precise dimensions may vary, it can be seen that the width of the mobile telephone, 50 mm in this example, is substantially greater than the thickness of the lower clamshell portion, 10 mm in this example, which houses the camera assembly. The lower clamshell portion 16 tends to be thicker than the upper clamshell portion because the components contained therein tend generally to require more space.

Figure 5:
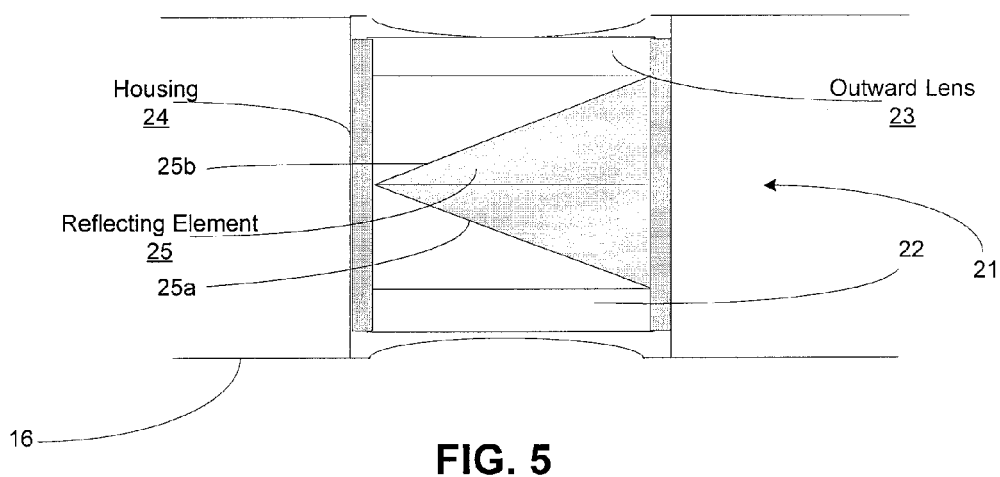
FIG. 5 is a schematic diagram of a lens assembly for use in accordance with embodiments of the present invention.

FIG. 5 depicts a side cross-sectional view of a lens assembly for use in accordance with embodiments of the present invention. The lens assembly may be located within the lower clamshell portion 16. The top edge of the figure represents the outward face, which is visible when the clamshell is in the closed position. The bottom edge of the figure represents the inward face which (if shown fully) would also contain the keypad. Thus, the inward face is visible only when the clamshell is in the open position. FIG. 5 depicts a lens assembly 21 containing the inward lens 22 and the outward lens 23. As stated above, the inward lens, which faces the user when the clamshell is in the open position, may be used for video telephony. The outward lens, which faces away from the user, may be used for taking digital still photographs or videos. The lenses are supported in a housing 24 and may be linearly aligned. Between the lenses is a reflecting element 25 having a first side 25a and a second side 25b. The first side faces one of the lenses, for example the video telephony lens, and the second side faces the other lens, for example the camera/video lens. As further described below, the reflective element may reflect light coming through each of the lenses onto an image sensor (not shown in this figure).

Figure 6:
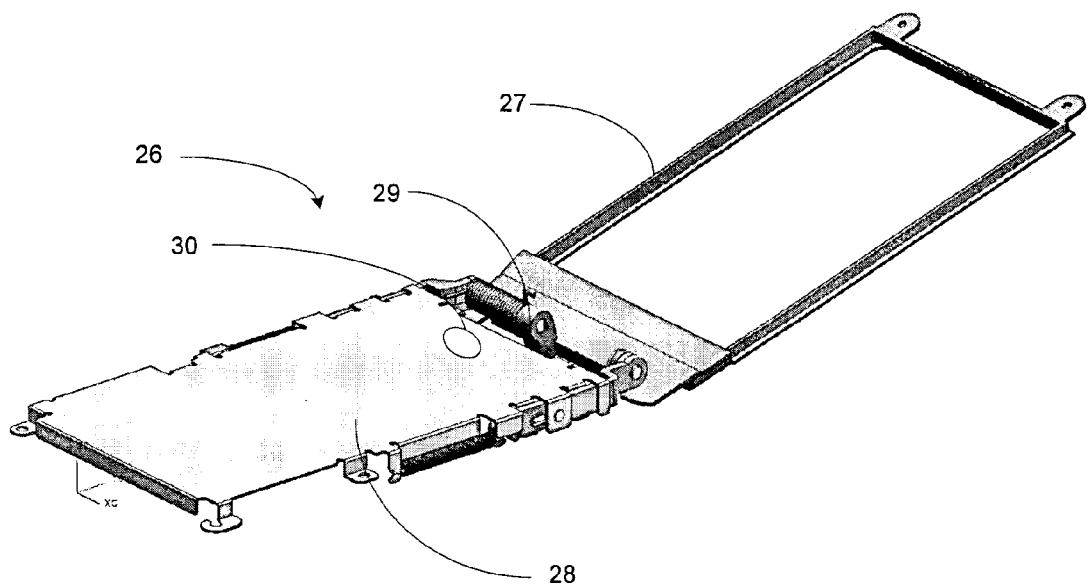
FIGS. 6 and 7 are schematic diagrams of a hinge assembly for use in accordance with embodiments of the present invention.
Figure 7:
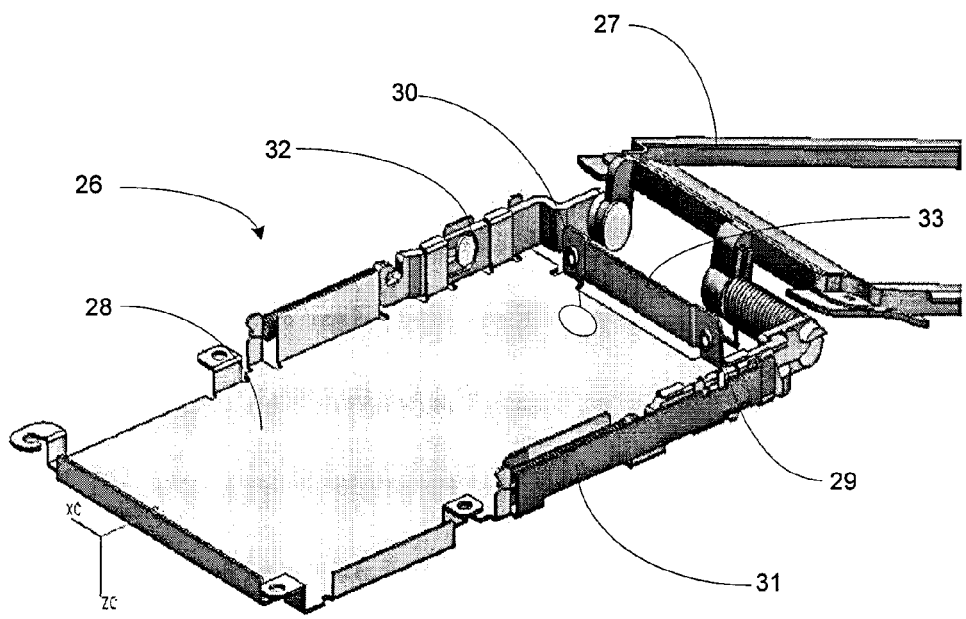

FIGS. 6 and 7 depict an exemplary hinge assembly 26. The hinge assembly provides a frame for the other components of the mobile telephone 10. The hinge assembly may include a top 27 for receiving and supporting the components of the upper clamshell portion 15, and a base 28 for receiving and supporting the components of the lower clamshell portion 16. The hinge assembly may further include pivot hinges 29, which permit the top to pivot from an open position to a closed position at which the top substantially covers the base. The base 28 may also have a lens hole 30 for receiving the lens assembly 21 (see FIG. 5). The lens assembly may be held in place by screw threads or other suitable fastening mechanism. The base 28 may also contain side rails 31 and 32, and front rail 33, as best seen in FIG. 7. The rails provide structure to support various components of the lower clamshell portion, and, as further described below, may constitute a camera housing for housing the camera assembly 20.

Figure 8:
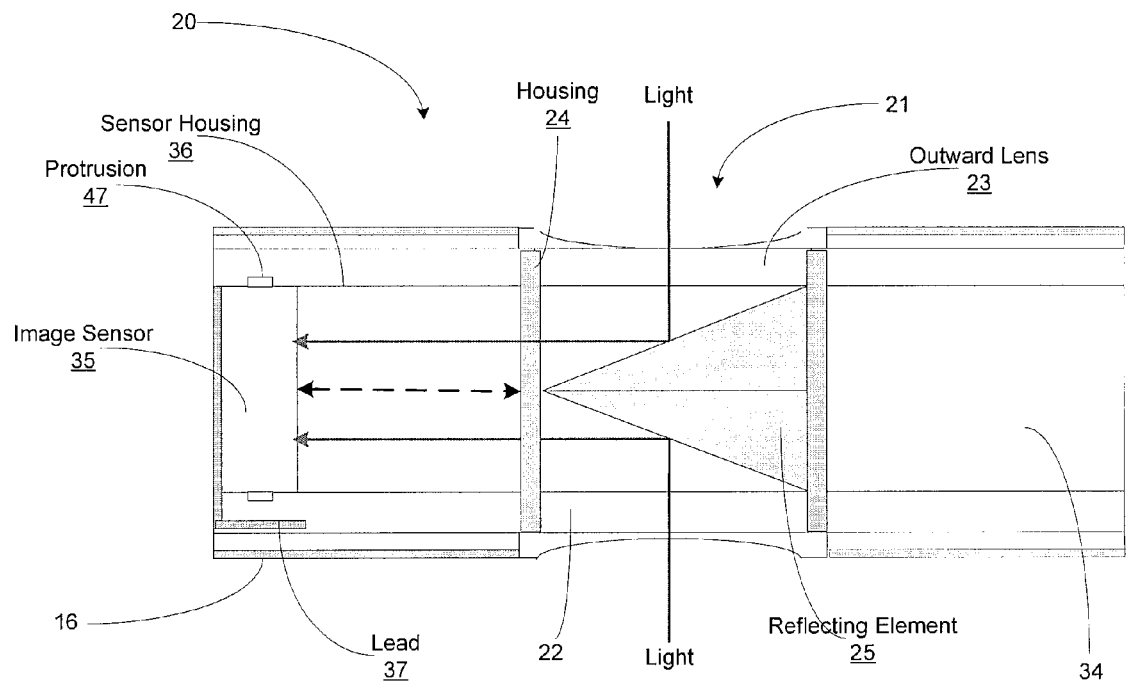
FIG. 8 is a schematic diagram of a camera assembly for use in accordance with embodiments of the present invention.

FIG. 8 depicts a cross-sectional side view of the entire camera assembly 20 as it may be positioned in the lower clamshell portion 16. The lens assembly 21 of FIG. 5 is substantially centrally located within the assembly. The various components of the lens assembly, as described above, are identified in FIG. 8 with the same reference numerals as in FIG. 5. A flash housing 34 for receiving a built-in flash, such as a Zeon flash, is depicted in the figure to the right of the lens assembly. An image sensor 35 is contained in a sensor housing 36. An electrical lead 37 may connect the image sensor to a flex circuit or printed circuit board (not shown), as is known in the art, to connect the image sensor with electronic circuitry for processing images received by the image sensor.

Figure 9:
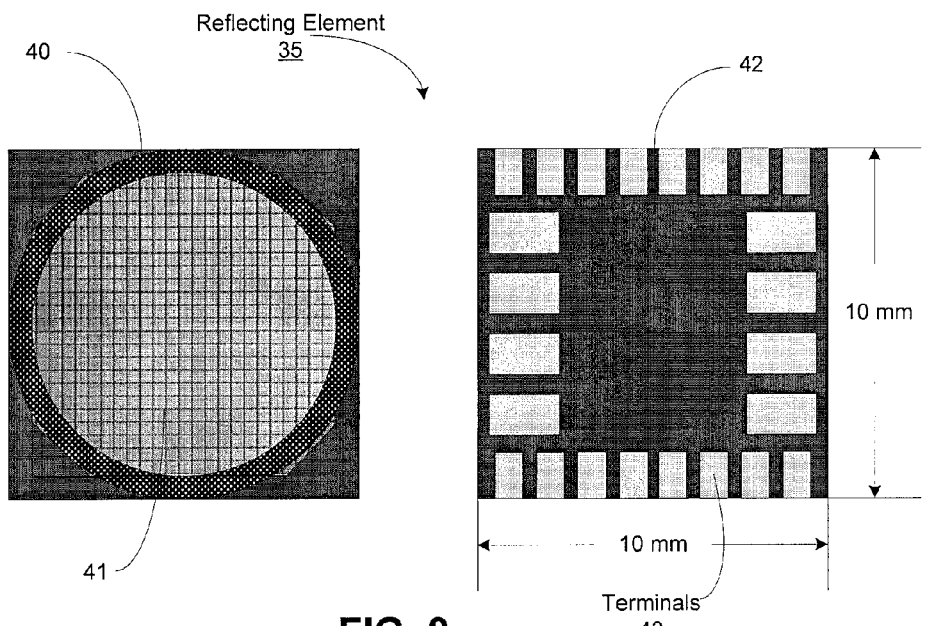
FIG. 9 is a schematic diagram of an image sensor for use in accordance with embodiments of the present invention.

Those skilled in the art of digital photography and video will appreciate how the lenses and image sensor operate to create a digital image. Generally, a lens focuses light onto the surface of the image sensor, which, with appropriate hardware, software, and/or firmware, processes the light into a digital photographic or video image. FIG. 9 depicts an exemplary image sensor 35. The image sensor has a front surface 40 containing a sensing layer 41 that actually senses the image being photographed. For example, sensing layer 41 may be a charged-coupled device (CCD) array, or other image sensing device as are known in the art. Image sensor 35 also may have a back surface 42 containing a plurality of electrical terminals 43. The electrical terminals may be connected to the electrical lead 37 (see FIG. 8). It will be appreciated that the structure of the image sensor 35 is exemplary, and other forms of image sensors may be employed.

The resolution of a digital camera in part is determined by the focal length, which is the distance between the lens and the surface of the image sensor. All other features being equal, usually the greater the focal length, the greater the resolution of the camera. In the typical configuration of the camera function of a clamshell mobile telephone, the lens and image sensor are incorporated into one portion of the clamshell and are linearly aligned. Such a configuration, however, may limit the resolution of the camera function because the permissible focal length is capped at about the thickness of one portion of the clamshell, which is about a half to two-thirds the total thickness of the mobile telephone when in the closed position. In the typical clamshell configuration, therefore, about 10 mm is the high end distance for housing all the optical elements and providing the focal length (see, e.g., FIG. 4). The actual resultant focal length may be significantly less than 10 mm because of the space devoted to the optical components. The present invention provides for a greater potential focal length by separating the lens from the image sensor such that they are not linearly aligned.

Referring again to FIG. 8, the bold arrows represent the path of light through each of the inward lens 22 (video telephony) and outward lens 23 (camera and/or video). The light is reflected off the reflective element 25 to the image sensor 35. In various embodiments, the reflective element is referred to herein as a prism. It will be appreciated that the reflective element 25 may take other forms, such as a mirror structure or comparably reflective structure as are known in the art. As represented by the dashed arrow, the camera assembly has an auto focus feature by which the image sensor 35 may move longitudinally within the sensor housing 36 to focus the image.

Figure 10:
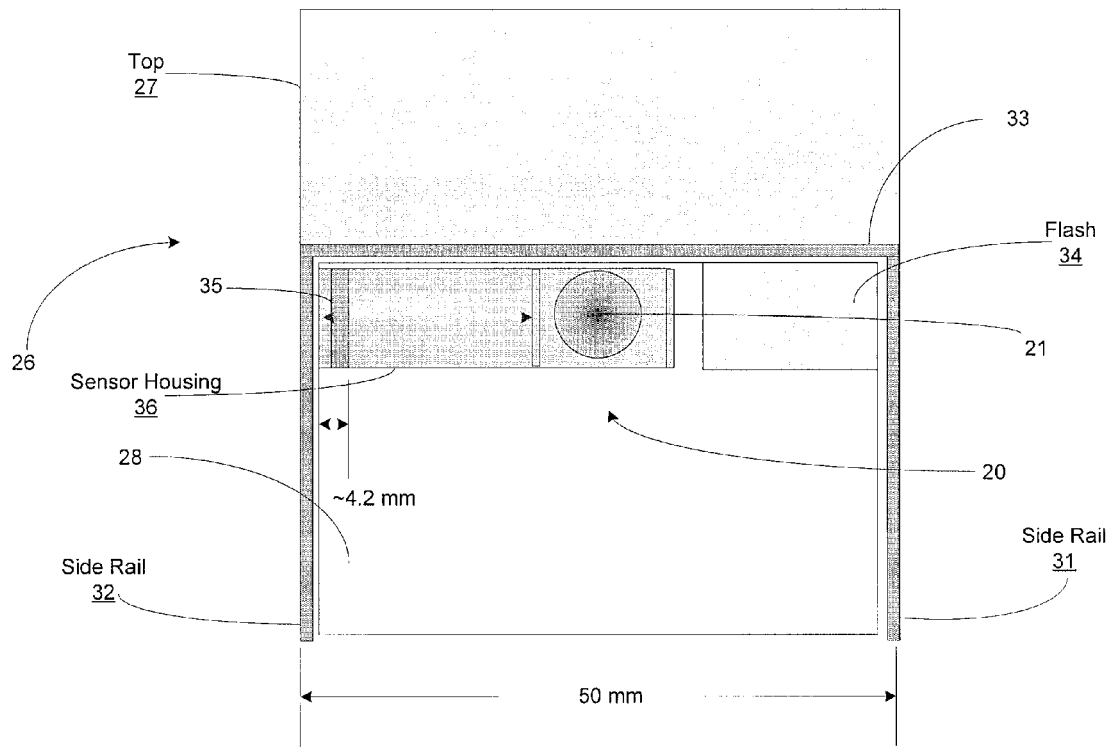
FIG. 10 is a schematic diagram of the camera assembly of FIG. 8 as it may be located in the hinge assembly of FIGS. 6 and 7 in accordance with embodiments of the present invention.

FIG. 10 is a top view of an exemplary placement of the camera assembly 20 within the hinge assembly 26 (which, as stated above, provides a frame for the upper and lower clamshell portions). In this exemplary embodiment, the camera assembly may be positioned within the base 28 of the hinge assembly 26, adjacent the front rail 33 and extending substantially the entire width of the telephone between the side rails 31 and 32. In this embodiment, the lens assembly 21 is substantially in the center with the flash housing 34 to the right of the lens assembly in the figure. The sensor housing 36 may be positioned on the side of the lens assembly opposite the flash. As indicated by the arrow, the image sensor 35 may move longitudinally within the sensor housing 36.

It will be appreciated, therefore, that in the configuration of FIG. 10 nearly half the width of the mobile telephone may be devoted to the transmission of light from the lenses to the image sensor. The resultant focal length, therefore, is on the order of 20 mm for the typical clamshell mobile telephone, which is substantially greater than the 10 mm approximate upper limit of the focal length in the typical clamshell configuration. In this manner, camera resolution may be substantially enhanced. Applicant has found that, with current lens and image sensor technology, a resolution of approximately five megapixels or greater may be achieved, which is comparable to the resolution commonly found in many stand-alone digital cameras. In addition, in the typical configuration, the auto focus feature is provided by moving the lens. In contrast, in embodiments of the present invention, the sensor is moved and the lenses are stationary. In this manner, a single tunable image sensor, in cooperation with a single reflecting prism, may provide image sensing for both a camera/video lens and a video telephony lens. In the typical clamshell configuration, to provide both features a second image sensor may be provided, which tends to increase the cost and difficulty of production.

Figure 11:
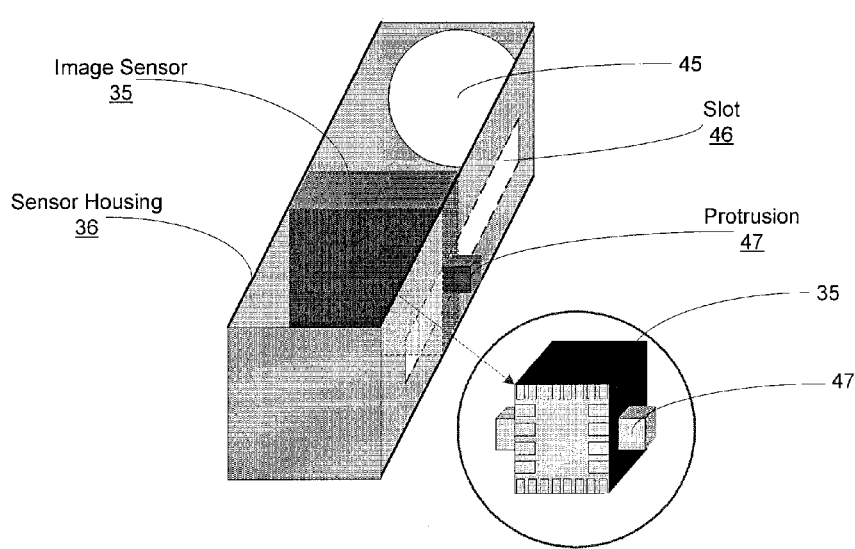
FIG. 11 is a schematic diagram of a sensor housing for use in accordance with embodiments of the present invention.

FIG. 11 provides an exemplary structure for a sensor housing in accordance with embodiments of the present invention. The sensor housing may provide an auto focus feature having a tunable image sensor that moves within the sensor housing. Auto focus features are known in the art, and therefore the optical and electronic principles behind an auto focus feature are not described in detail. In the configuration of the current disclosure, image sensor 35 is located within the sensor housing 36. An opening 45 in the sensor housing 36 may permit light from one or more lenses to travel to the image sensor. The sensor housing may include at least one slot 46 cut out of at least one face of the sensor housing. The image sensor 35 may include at least one protrusion 47 that cooperates with the slot 46. In this manner, the image sensor may move along the sensor housing with the protrusion 47 moving along the slot 46. In alternative embodiments, additional protrusions and corresponding slots may be incorporated to facilitate the movement of the image sensor within the sensor housing. For example, the magnified portion of FIG. 11 depicts an image sensor having two protrusions 47 with one each on opposite sides. (An embodiment with two protrusions 47 also is depicted in FIG. 8.) These configurations will be understood as being exemplary, and other configurations may be employed.

Figure 12:
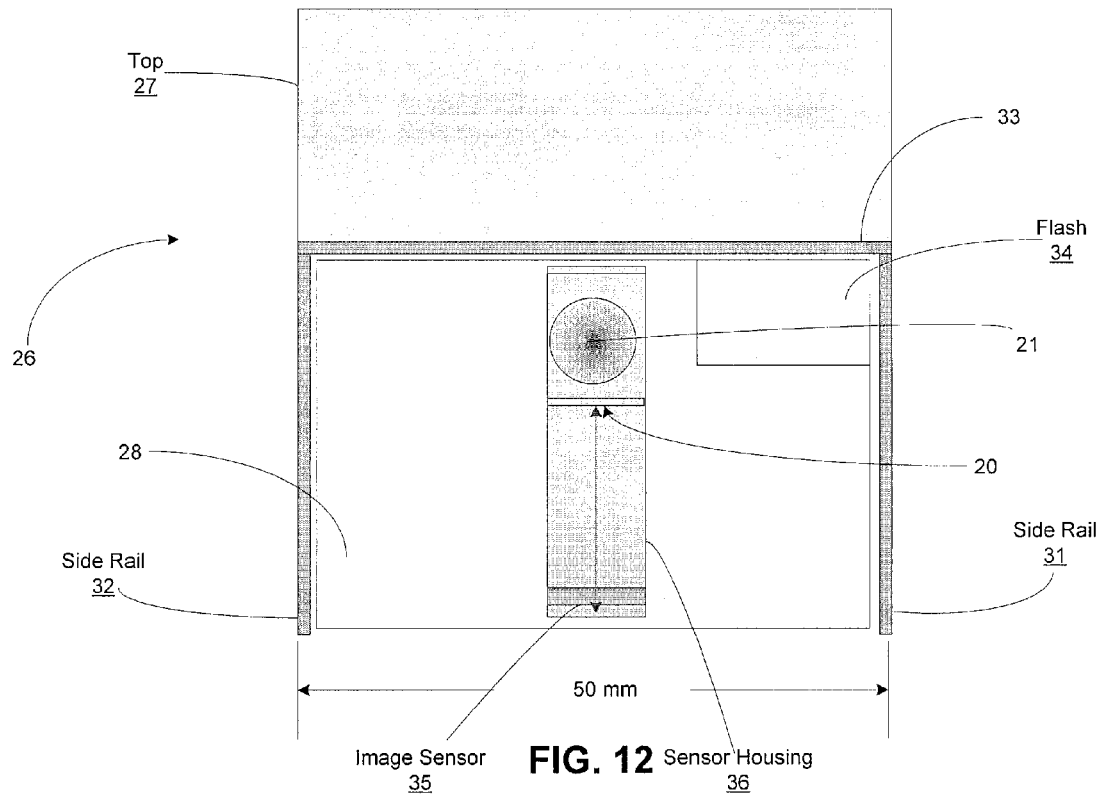
FIGS. 12 and 13 are schematic diagrams of alternative orientations of the camera assembly of FIG. 8 as it may be located in the hinge assembly of FIGS. 6 and 7 in accordance with embodiments of the present invention.
Figure 13:
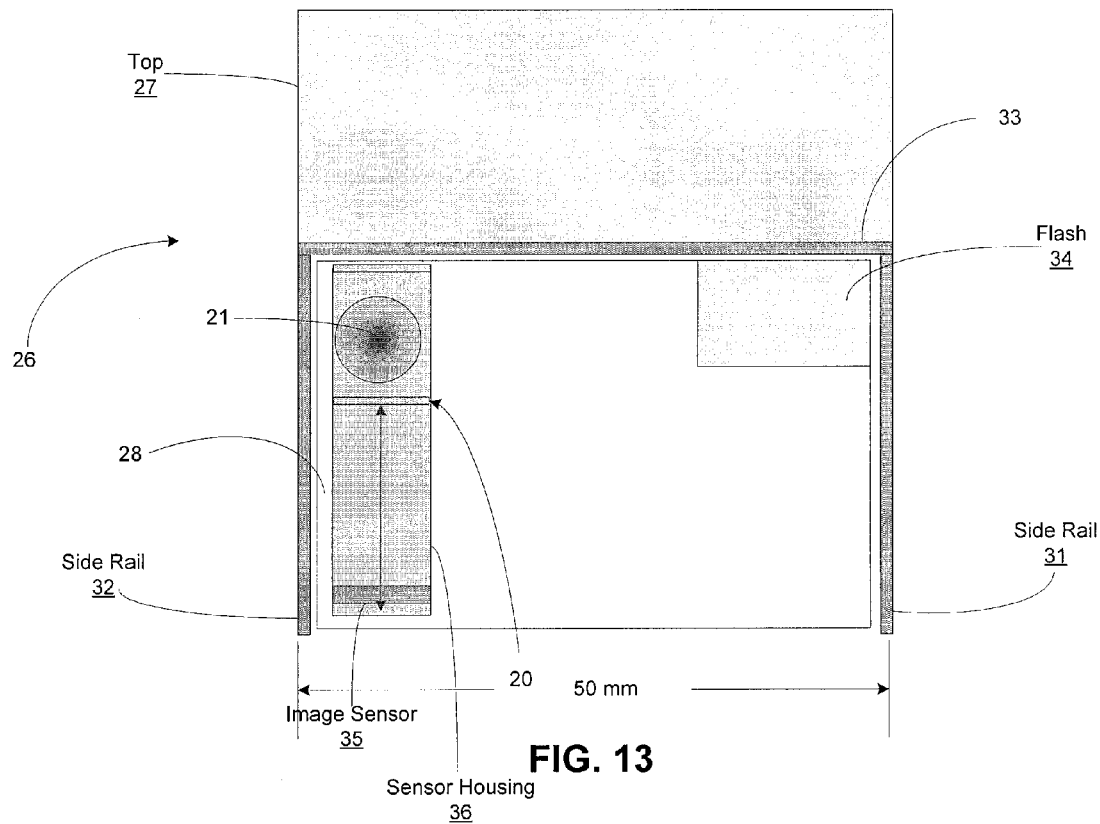

FIGS. 12 and 13 depict exemplary embodiments in which alternative orientations of the lens assembly 21 and sensor housing 36 are shown. In these embodiments, the lens assembly and sensor housing are oriented along a length of the lower clamshell portion within the hinge assembly. In FIG. 12, the lens assembly and sensor housing are oriented along the center of the hinge assembly. In FIG. 13, the lens assembly and sensor housing are oriented along the side rail 32. Other orientations may be employed.

Figure 14:
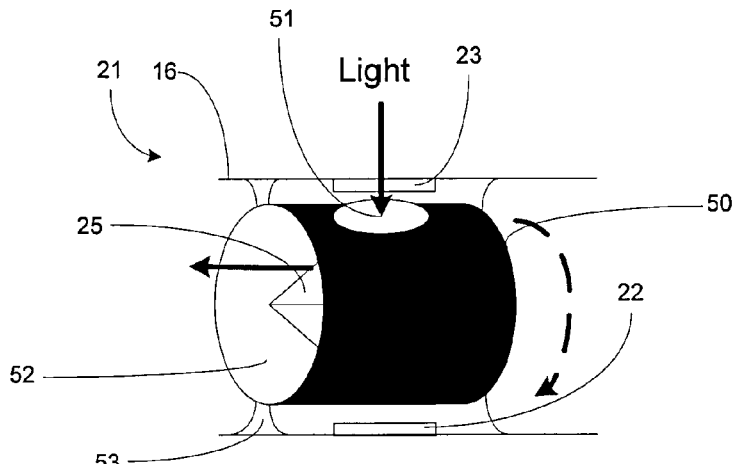
FIG. 14 is a schematic diagram of a lens assembly for use in accordance with embodiments of the present invention.

FIG. 14 depicts an alternative embodiment of the lens assembly 21. As in previous embodiments, the lens assembly may include an inward (video telephony) lens 22, an outward (camera/video lens) 23, and a reflective prism 25. In this embodiment, the reflective prism may be enveloped by a sleeve 50. The sleeve 50 may be a substantially cylindrical structure made of an opaque, rigid material such as a rigid plastic. Other shapes and materials may be employed, provided that the material is substantially opaque. The sleeve also may be made of a substantially opaque coating applied to a base material. The sleeve 50 may include a lens opening 51 and a side opening 52. The sleeve also may be mounted on supports 53 housing a drive mechanism (not shown).

The sleeve permits light from essentially only one of the lenses to reach the image sensor while substantially blocking the light from the other. In FIG. 14, the solid arrows represent the path of the light. As depicted in this example, the sleeve is in a first position with the lens opening 51 facing the outward lens 23. Light may be transmitted through the outward lens 23 and pass through the lens opening 51 to reach the prism 25. The light may then be reflected out of the sleeve through the side opening 52 to be transmitted to the image sensor. Light from the inward lens 22, however, is substantially blocked by the opaque surface of the opposite side of the sleeve. The depicted example represents a mode for taking digital photographs or videos using the outward lens. As indicated by the broken arrow, the sleeve may be rotated by the drive mechanism to a second position in which the lens opening now faces the inward (video telephony) lens. For example, should a user receive or make a call, the user my switch from a camera mode to a video telephony mode. The user may do so, for example, by pressing one of the buttons on the keypad, or by pressing one of the side buttons. One of such inputs may cause the sleeve to rotate to a second position in which the lens opening 51 faces the inward lens 22. Light now may pass from the video telephony lens to the prism to be reflected to the image sensor. Light from the outward camera lens is now substantially blocked. In this manner, the sleeve improves image quality by reducing ambient light that may otherwise enter through the unused lens.

Figure 15:
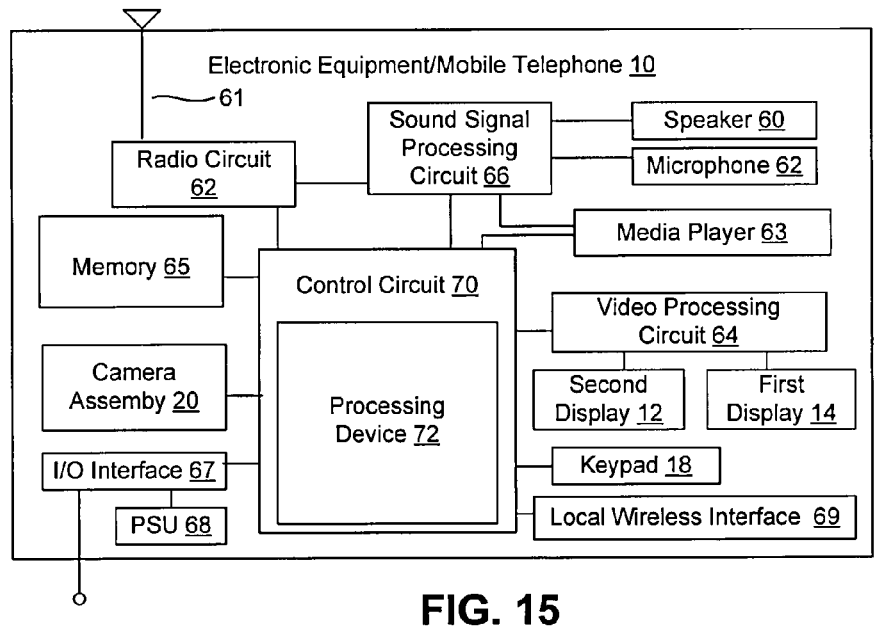
FIG. 15 is a schematic block diagram of operative portions of the mobile telephone of FIG. 1.
Figure 16:
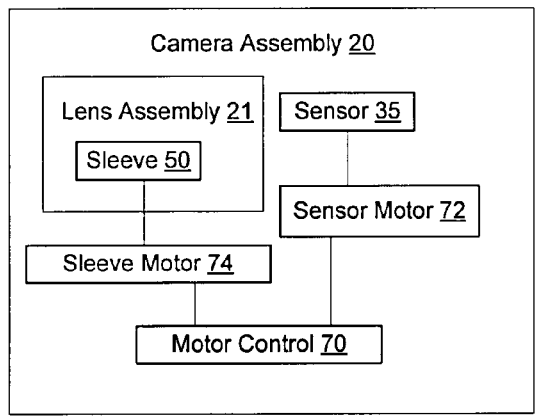
FIG. 16 is a schematic block diagram of operative portions of an embodiment of a camera assembly for use in accordance with embodiments of the present invention.

FIG. 15 represents a functional block diagram of the mobile telephone 10. FIG. 16 represents a functional block diagram of an exemplary camera assembly 20 from FIG. 3. The camera assembly 20 is equipped with an auto focus feature. As components of the autofocus feature, a motor control 70 may control a sensor motor 72 to provide the tunable sensor as described above. Motor control 70 also may control a sleeve motor 74 to rotate the sleeve between the photography/video position and the video telephony position.

Referring again to FIG. 15, additional components of the mobile telephone 10 will now be described. For the sake of brevity, generally conventional features of the mobile telephone 10 will not be described in great detail herein. Mobile telephone 10 may include a camera function 20 as described above. The mobile telephone 10 also may include a memory 65 that may store various device functions as executable program code, as well as various media objects. The media objects may include digital photographs and/or videos taken using the camera assembly 20.

The mobile telephone 10 includes call circuitry that enables the mobile telephone 10 to establish a call and/or exchange signals with a called/calling device, typically another mobile telephone or landline telephone, or another electronic device. The mobile telephone 10 also may be configured to transmit, receive, and/or process data such as text messages (e.g., colloquially referred to by some as "an SMS," which stands for short message service), electronic mail messages, multimedia messages (e.g., colloquially referred to by some as "an MMS," which stands for multimedia message service), image files, video files, audio files, ring tones, streaming audio, streaming video, data feeds (including podcasts) and so forth. Processing such data may include storing the data in the memory 65, executing applications to allow user interaction with data, displaying video and/or image content associated with the data, outputting audio sounds associated with the data and so forth.

The mobile telephone 10 may include a primary control circuit 70 that is configured to carry out overall control of the functions and operations of the mobile telephone 10. The control circuit 70 may include a processing device 72, such as a CPU, microcontroller or microprocessor. The control circuit 70 and/or processing device 72 may comprise a controller that may execute program code embodied within the mobile telephone to control the various device functions. It will be apparent to a person having ordinary skill in the art of computer programming, and specifically in application programming for cameras, mobile telephones or other electronic devices, how to program a mobile telephone to operate and carry out logical functions associated with mobile telephone 10. Accordingly, details as to specific programming code have been left out for the sake of brevity. Also, while the code may be executed by control circuit 70 in accordance with an exemplary embodiment, such controller functionality could also be carried out via dedicated hardware, firmware, software, or combinations thereof.

The mobile telephone 10 may include an antenna 61 coupled to a radio circuit 62. The radio circuit 62 includes a radio frequency transmitter and receiver for transmitting and receiving signals via the antenna 61 as is conventional. The mobile telephone 10 further includes a sound signal processing circuit 66 for processing audio signals transmitted by and received from the radio circuit 62. Coupled to the sound processing circuit 66 are a speaker 60 and microphone 62 that enable a user to listen and speak via the mobile telephone 10 as is conventional (see also FIG. 1).

The first and second displays 14 and 12 may be coupled to the control circuit 70 by a video processing circuit 64 that converts video data to a video signal used to drive the various displays. The video processing circuit 64 may include any appropriate buffers, decoders, video data processors and so forth. The video data may be generated by the control circuit 70, retrieved from a video file that is stored in the memory 65, derived from an incoming video data stream received by the radio circuit 62 or obtained by any other suitable method.

The mobile telephone 10 also may include a local wireless interface 69, such as an infrared transceiver and/or an RF adaptor (e.g., a Bluetooth adapter), for establishing communication with an accessory, another mobile radio terminal, a computer or another device. For example, the local wireless interface 69 may operatively couple the mobile telephone 10 to a headset assembly (e.g., a PHF device) in an embodiment where the headset assembly has a corresponding wireless interface.

The mobile telephone 10 also may include an I/O interface 67 that permits connection to a variety of I/O conventional I/O devices. One such device is a power charger that can be used to charge an internal power supply unit (PSU) 68. Mobile telephone 10 also may include a media player 63 as is conventional.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A camera assembly for use in a portable electronic device comprising:
   a first lens;
   a second lens;
   a reflective element between the first and second lenses and having a first side and a second side, wherein light that passes through the first lens is reflected by the first side of the reflective element and light that passes through the second lens is reflected by the second side of the reflective element;
   an image sensor that is not linearly aligned with either the first lens or the second lens, wherein light that passes through either the first lens or the second lens is reflected by the reflective element and transmitted onto the image sensor;
   a sensor housing containing the image sensor, wherein the sensor housing has at least one slot cut out of at least one face of the sensor housing and the image sensor has at least one protrusion that cooperates with the slot, and the image sensor moves along the sensor housing with the protrusion moving along the slot to alter the distance of the image sensor from the reflective element; and
   a sleeve that is movable between a first position and a second position, wherein in the first position light is transmitted from the first lens to the reflective element and light is not transmitted from the second lens to the reflective element, and wherein in the second position, light is transmitted from the second lens to the reflective element and light is not transmitted from the first lens to the reflective element.

2. The camera assembly of claim 1 further comprising a lens housing containing the lens and the reflective element.

3. The camera assembly of claim 1, wherein the sleeve has a substantially cylindrical shape and is rotated between the first position and the second position.

4. The camera assembly of claim 1, wherein the reflective element is a prism.

5. An electronic device comprising:
   a camera assembly comprising
      a first lens;
      a second lens;
      a reflective element between the first and second lenses and having a first side and a second side, wherein light that passes through the first lens is reflected by the first side of the reflective element and light that passes through the second lens is reflected by the second side of the reflective element;
      an image sensor that is not linearly aligned with either the first lens or the second lens, wherein light that passes through either the first lens or the second lens is reflected by the reflective element and transmitted onto the image sensor;

a sensor housing containing the image sensor, wherein the sensor housing has at least one slot cut out of at least one face of the sensor housing and the image sensor has at least one protrusion that cooperates with the slot, and the image sensor moves along the sensor housing with the protrusion moving along the slot to alter the distance of the image sensor from the reflective element; and a sleeve that is movable between a first position and a second position, wherein in the first position light is transmitted from the first lens to the reflective element and light is not transmitted from the second lens to the reflective element, and wherein in the second position, light is transmitted from the second lens to the reflective element and light is not transmitted from the first lens to the reflective element; and a camera housing containing the camera assembly.

6. The electronic device of claim 5 further comprising an upper clamshell potion and a lower clamshell portion, wherein the upper clamshell portion and lower clamshell portion are movable relative to one another between an open and a closed clamshell position, and further wherein the camera housing containing the camera assembly is the lower clamshell portion.

7. The electronic device of claim 6, wherein the camera assembly is oriented along a width of the lower clamshell portion, and the image sensor is movable along a portion of the width.

8. The electronic device of claim 6, wherein the camera assembly is oriented along a length of the lower clamshell portion, and the image sensor is movable along a portion of the length.

9. The electronic device of claim 6, wherein the sensor is movable within the lower clamshell portion for a distance of at least 20 mm.

10. The electronic device of claim 6, wherein when the upper clamshell portion and lower clamshell portion are in the open clamshell position, the first lens is located on an inward face of the lower clamshell portion and the second lens is located on an outward face of the lower clamshell portion.

11. The electronic device of claim 10, wherein the first lens and the second lens are linearly aligned.

12. The electronic device of claim 6, wherein the first lens is a camera or video lens for taking photographs or videos, and the second lens is a video telephony lens for participating in video telephone calls.

13. The electronic device of claim 5, wherein the sleeve has a substantially cylindrical shape and is rotated between the first position and the second position.

14. The electronic device of claim 5, wherein the resolution of the camera assembly is at least five megapixels.

15. The electronic device of claim 5, wherein the electronic device is a mobile telephone.

16. The electronic device of claim 5, wherein the reflective element is a prism.

* * * * *